Figure 1:
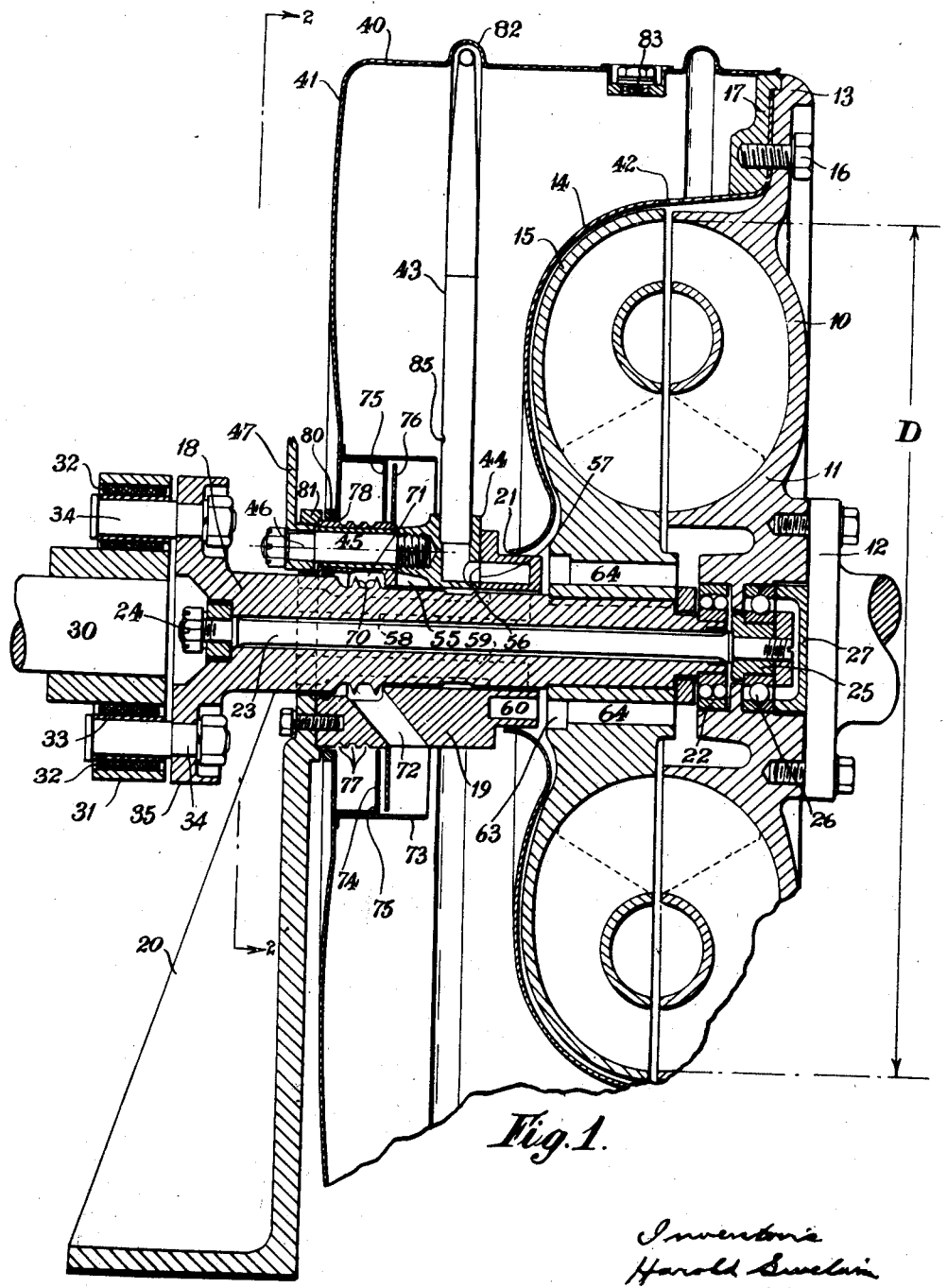

Jan. 16, 1940.  H. SINCLAIR ET AL  2,187,667
HYDRAULIC POWER TRANSMITTER
Filed April 4, 1938   7 Sheets-Sheet 2

Jan. 16, 1940.　　　H. SINCLAIR ET AL　　　2,187,667
HYDRAULIC POWER TRANSMITTER
Filed April 4, 1938　　　7 Sheets-Sheet 4

Inventors
Harold Sinclair
Arthur Cecil Buck
by
Dean Fairbank & Hirsch
Attys.

Jan. 16, 1940.　　H. SINCLAIR ET AL　　2,187,667
HYDRAULIC POWER TRANSMITTER
Filed April 4, 1938　　7 Sheets-Sheet 6

Patented Jan. 16, 1940

2,187,667

UNITED STATES PATENT OFFICE 2,187,667

HYDRAULIC POWER TRANSMITTER

Harold Sinclair, Kensington, London, and Arthur Cecil Basebe, Banstead, England, assignors to Hydraulic Coupling Patents Limited, London, England, a company of Great Britain Application April 4, 1938, Serial No. 199,901
In Great Britain April 8, 1937

19 Claims. (Cl. 60—54)

The present invention relates to hydraulic power transmitters of the kinetic type and provided with scooping means whereby the liquid content of the working chamber thereof can be varied while the transmitter is operating, as disclosed in the specification of Patent No. 1,859,607.

An object of the present invention is to provide an improved scoop-controlled hydraulic power transmitter requiring only a relatively small quantity of working liquid, which is continuously cooled while power is being transmitted.

A further object is to provide such a device which is simple in design and easy to control, and which is adapted for use in confined spaces.

Another object is to provide a hydraulic power transmitter which is adapted for use as an automatic starting clutch for electric motors, and engines, which do not conveniently develop a high starting torque.

According to this invention in one aspect the improved hydraulic power transmitter comprises a working chamber including driving and driven vaned elements, a reservoir chamber arranged to rotate with said working chamber, a drain port which is incapable of being closed while said chambers are rotating, which communicates between said chambers and which is capable of exhausting working liquid, under the influence of its energy of motion, from said working chamber, a scoop which is disposed in said reservoir chamber and which is capable of angular displacement eccentrically with respect to the axis of rotation of the transmitter, a filling duct leading from said scoop to said working chamber, and means for controlling the displacement of said scoop.

According to this invention in another aspect, a hydraulic power transmitter of the kinetic type comprises a working chamber including driving and driven vaned elements, a reservoir chamber arranged to rotate with said working chamber and having an effective capacity of at least 50 per cent of the normal maximum liquid content of the working chamber, a permanently open passage between said chambers, which is adapted to exhaust at least a part of the liquid content of said working chamber, when said chambers are at rest, a scoop disposed in said reservoir chamber for engaging liquid therein, and a filling duct at all times communicating between said scoop and said working chamber, said scoop being arranged to effect a limited rate of filling such that the transmitter is enabled to operate as a starting clutch.

The features of the invention will be explained with reference to the examples shown in the accompanying drawings in which—

Figure 2:
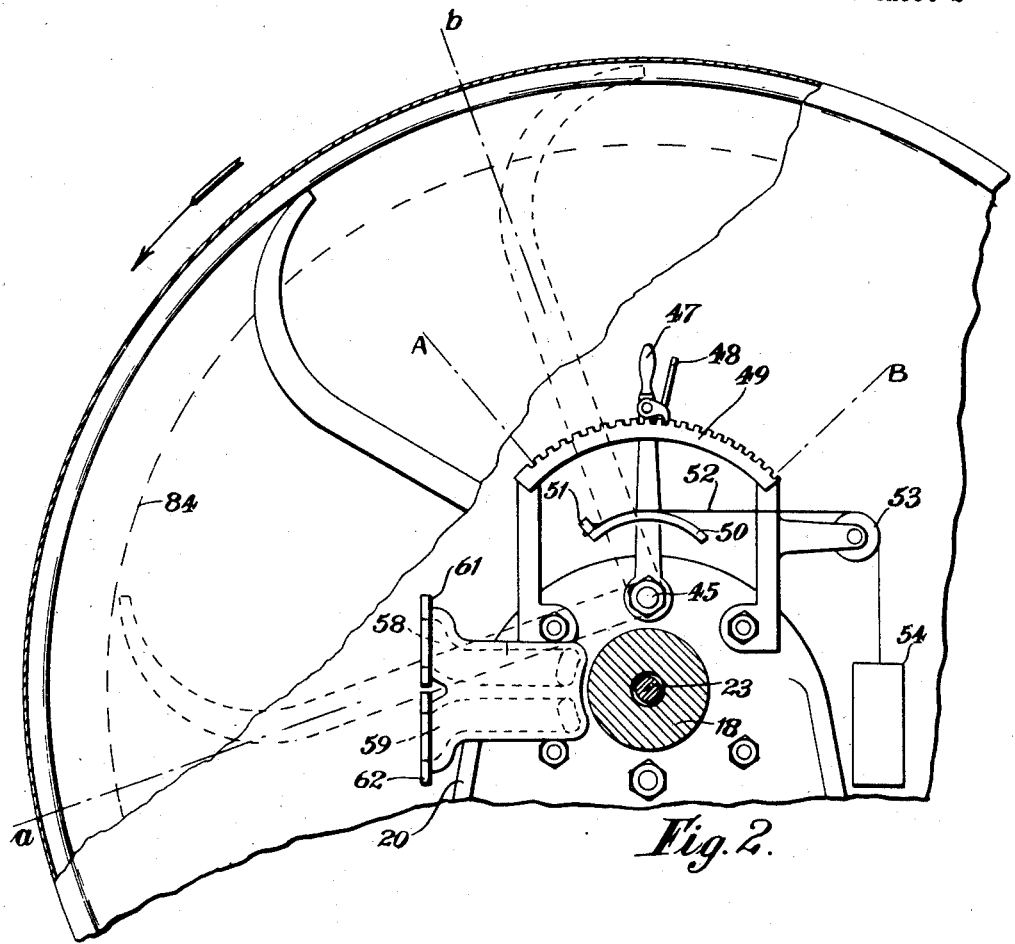
Figure 3:
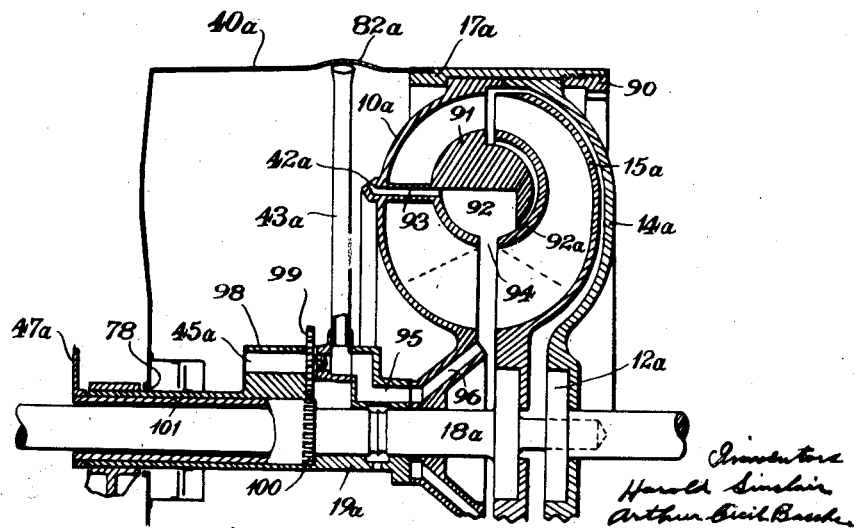
Figure 4:
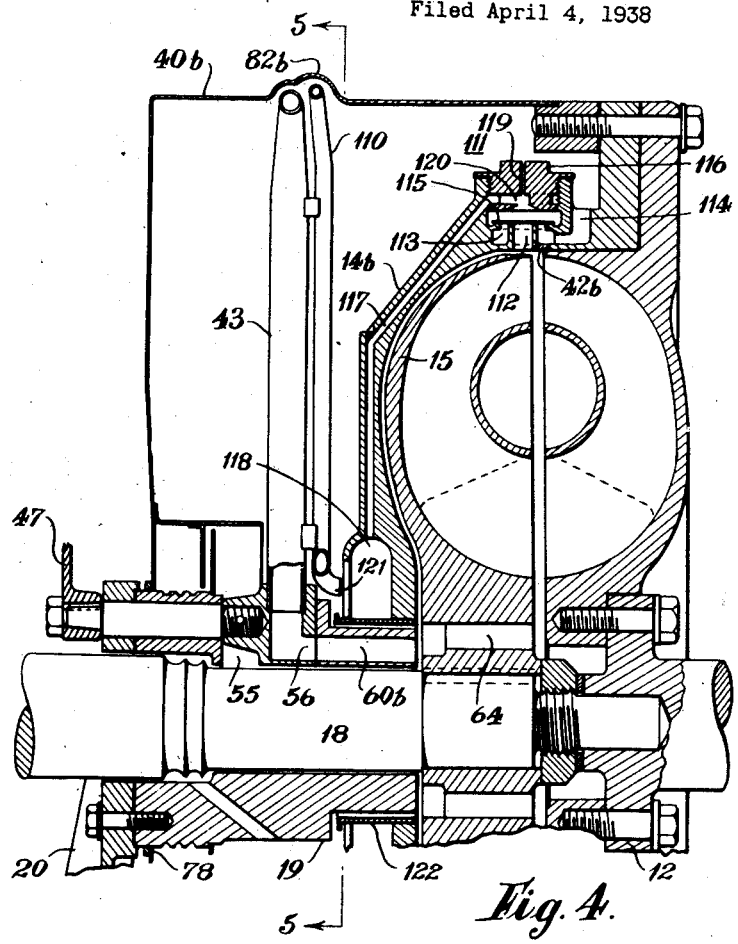
Figure 7:
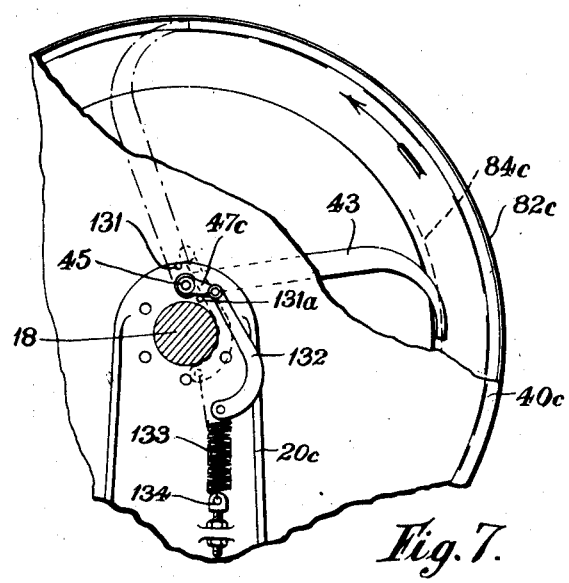
Figure 5:
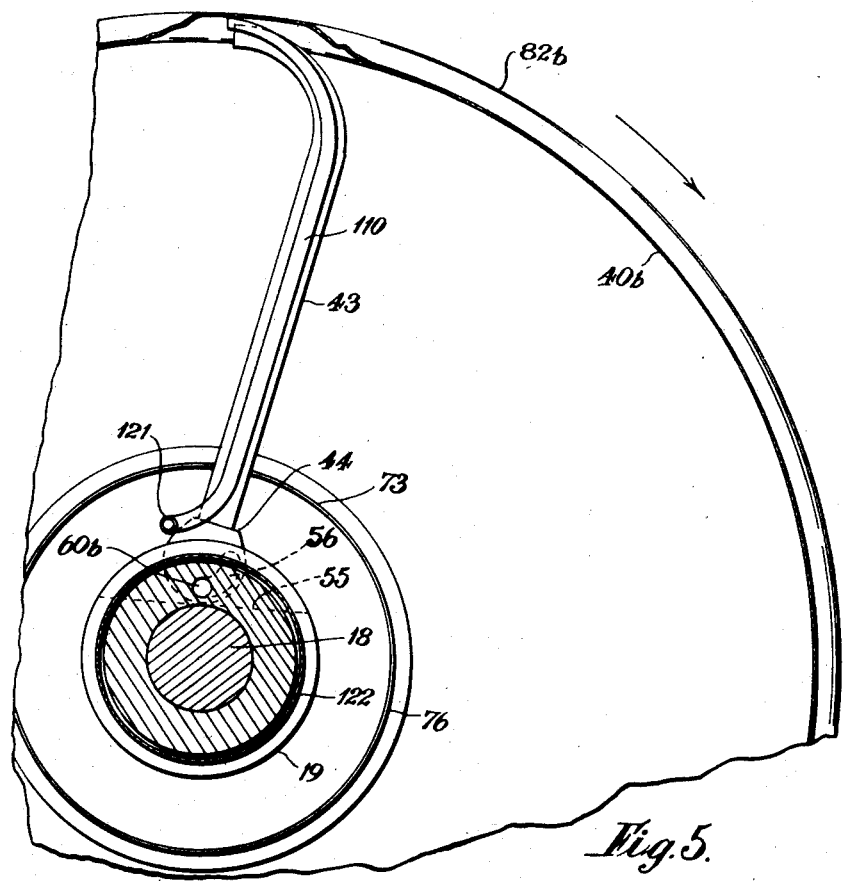
Figure 10:
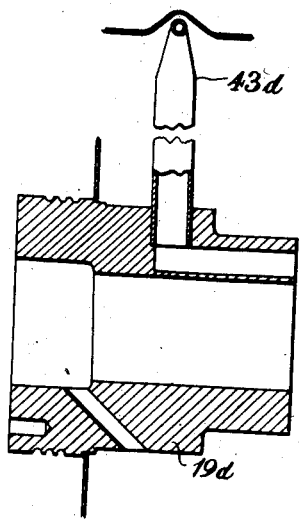
Figure 6:
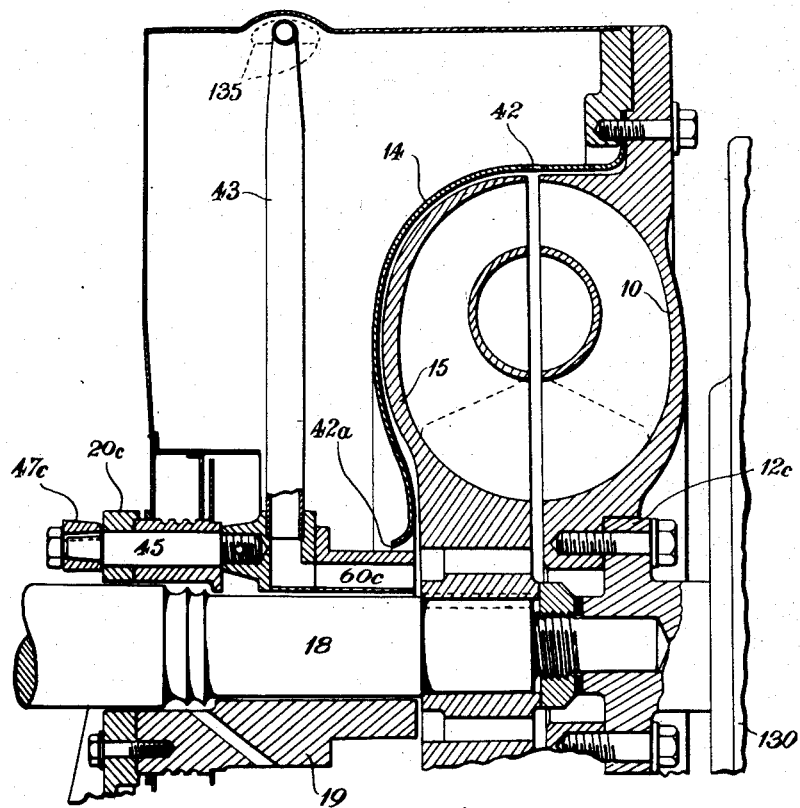
Figure 8:
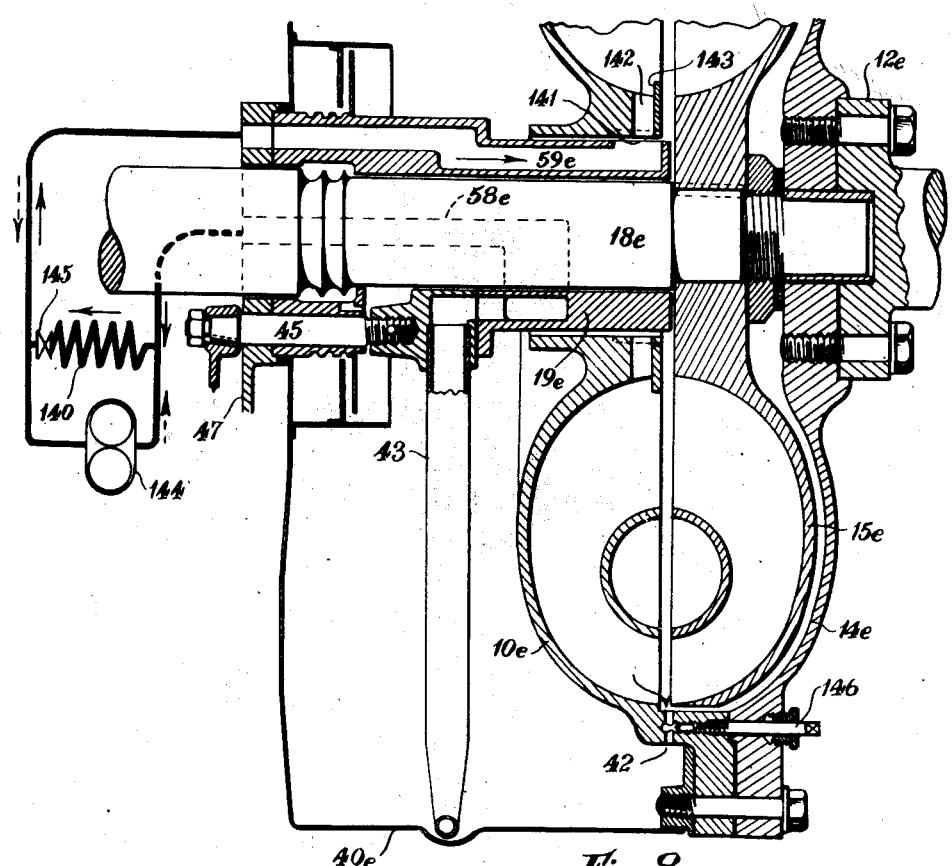
Figure 9:
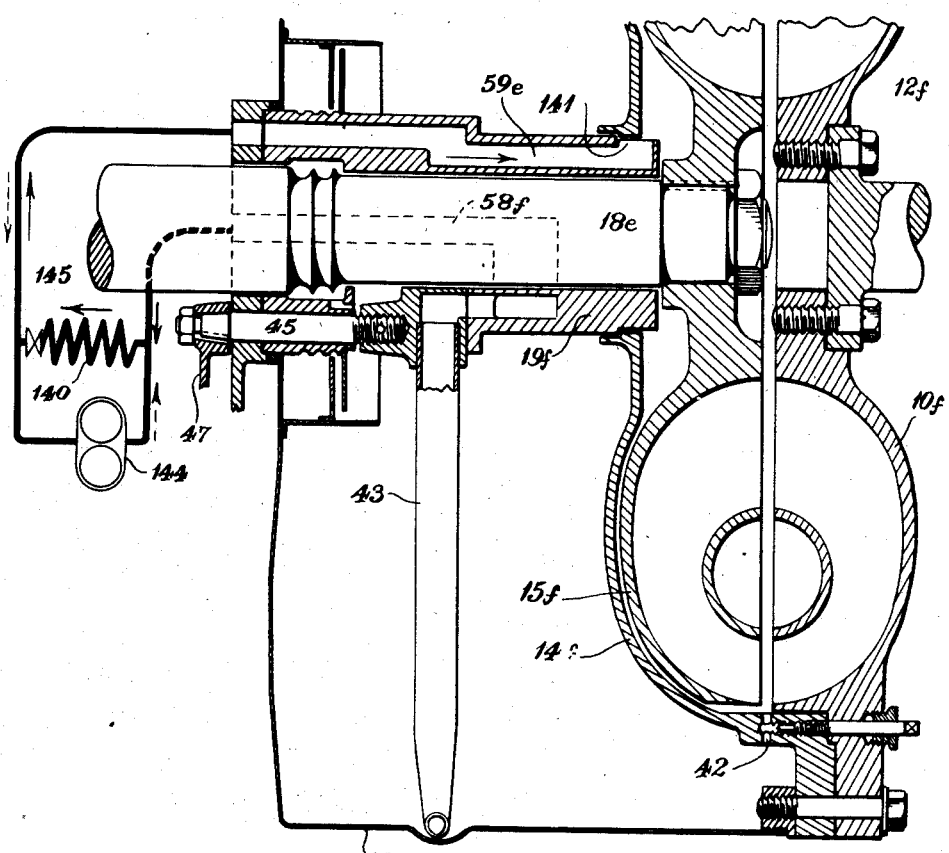

Fig. 1 is a sectional side elevation of one form of hydraulic coupling in accordance with this invention, Fig. 2 is a sectional end view on the line 2—2 in Fig. 1, Fig. 3 shows diagrammatically in section a modified form of improved coupling, Fig. 4 shows diagrammatically in section a further modification, Fig. 5 is a sectional end view on the line 5—5 in Fig. 4, Fig. 6 shows diagrammatically in section another modification especially suitable for use as an automatic starting clutch for an electric motor, Fig. 7 is an end elevation partly in section, to a smaller scale, of the arrangement shown in Fig. 6, Figs. 8 and 9 show in section respectively two further modifications which are especially suitable for marine installations, and Fig. 10 shows a modified part adapted for substitution in the coupling shown in Fig. 6.

Referring to Figs. 1 and 2, a vaned impeller element includes a dished shell 10 having a boss 11 fixed to a driving shaft 12, which may be the shaft of a synchronous electric motor. A dished shell 14 encloses the back of a vaned runner element 15 with as small a clearance as possible and its outer edge is clamped by screws 16 between a flange 13 on the impeller and a ring 17, the impeller shell 10 and the shell 14 co-operating to form a working chamber. A hollow runner shaft 18, to which the runner 15 is fixed, passes with a small radial clearance through a thick manifold sleeve 19 which is kept stationary by a supporting bracket 20. The dished shell 14 has a central aperture 21 accommodating the inner end of this sleeve. The inner end of the runner shaft is supported in the boss 11 of the impeller by a self-aligning journal bearing 22. Axial spacing of the impeller and runner is maintained by a rod 23 passing with radial clearance through and fixed at its outer end 24 to the hollow runner shaft. The inner end of the rod 23 is fixed by an adapter 25 to the inner race of a bi-directional thrust bearing 26 the outer race of which is clamped to the hub 11 by a screwed plug 27. A driven shaft 30 is supported in bearings not shown, and to it is fixed a flange 31 accommodating a plurality of compressed rubber bushes 32 the inner steel sleeves 33 of which are engaged with pins 34 fixed in a flange 35 on the runner shaft.

The shell 14 is enclosed in turn by a pressed and rolled steel casing having a substantially cylindrical portion 40, welded at one end to the ring 17, and an end wall portion 41 in which is a central aperture 78 accommodating the sleeve 19. The casing 40, 41 and the shell 14 form a reservoir chamber rotating with the impeller and communicating with the working chamber by a plurality of permanently open small drain ports 42 formed in the shell 14 at or almost at the radially outermost part of the working chamber and uniformly distributed about the coupling axis. In this example the effective capacity of the reservoir, namely the volume of the annular portion of this reservoir, between the casing portion 40 and a cylindrical surface which is coaxial with the shafts and which is at a radius equal to the distance from the shaft axis to the drain ports 42, is not less than the normal maximum liquid content of the working chamber. By "normal maximum liquid content" is meant the smallest quantity of liquid contained in the working chamber that yields minimum slip between the impeller and the runner when power is being transmitted. This quantity may be less than the volume of the working chamber as a whole.

A scoop in the form of a tube 43 is fixed to a boss 44 which in turn is fixed to a pin 45 which is journalled in the fixed sleeve 19 so as to be capable of angular displacement about an axis 46 parallel to the axis of rotation of the coupling. A control lever 47 is keyed to the pin 45 and is provided with a latch 48 (Fig. 2) cooperating with a fixed notched quadrant 49. The lever can be displaced between positions A and B and latched in these positions as well as in several intermediate positions. An arcuate guide 50 is fixed to the lever 47, and a flexible wire 52 is fixed to a lug 51 formed at one end of the guide 50, the wire passing over a fixed pulley 53 and supporting a weight 54 which therefore urges the lever 47 clockwise, as seen in Fig. 2, with a uniform torque.

The scoop tube boss 44 (Fig. 1) is accommodated in a transverse groove 55 formed in the manifold sleeve 19, and this boss is provided with a port 56 which communicates with the bore of the scoop tube and which is so shaped that, in all positions of the scoop tube it is open to a port 57 formed in the inner face of the groove 55. When the hydraulic coupling is a large one, or intended to work for long periods at high torque and slip, the port 57 communicates by a duct 58 with a flanged union 61 (Fig. 2) forming a flow connection to an external cooler (not shown). A flanged union 62, forming the return connection to the cooler, communicates by a duct 59 with a port 60 (Fig. 1) in the inner end of the sleeve. The port 60 leads to an annular groove 63 in the runner from which lead a plurality of filling ducts 64 for charging the working circuit. Where the coupling is small or employed for light work, the external cooler and the ducts 58 and 59 may be omitted, the port 57 leading directly to the port 60.

The runner shaft 18 is provided with thrower rings 70 arranged to throw working liquid, which leaks between the sleeve 19 and this shaft, into a ring groove 71 from which it drains by a duct 72 to the reservoir chamber.

The central aperture 78 in the end wall 41 of the reservoir chamber is sealed with respect to the sleeve 19 by a labyrinth gland which includes a cylindrical tube 73 fixed to the wall 41 and having fixed between its ends an annular diaphragm 74 the aperture of which is slightly larger in diameter than the adjacent part of the sleeve 19. Drain ports 75 are provided in the marginal portion of this diaphragm. An annular disk 76, having a diameter slightly less than the internal diameter of the tube 73, is fixed to the sleeve 19 and disposed close to the diaphragm 74 and on the side thereof remote from the end wall 41. The outer surface of the sleeve 19 between the end wall 41 and the diaphragm 74 is provided with circumferential grooves 77 which serve to throw off working liquid which tends to creep along this surface towards the aperture 78.

The end wall 41 of the reservoir chamber is slightly bulged to render it stiff, and to it is secured an accurately turned and faced ring 80 juxtaposed to and having the same diameter as a similarly machined annular facing 81 on the bracket 20. The members 80 and 81 cooperate to form a means for checking, by feeler gauges and a straight edge, the alignment and the axial relationship of the fixed sleeve 19 and the driving parts of the coupling.

The peripheral wall 40 of the reservoir is provided with a circumferential outward bulge in the form of a groove 82 adapted to receive the lip of the scoop tube 43 when it is in one extreme position.

The apparatus operates as follows. A measured quantity of working liquid is admitted through a filling plug 83 and drains to the lower part of the reservoir chamber (the axis of rotation being horizontal), some of it entering the working chamber by those of the drain ports 42 that are near the bottom. The control lever is latched in position A so that the scoop tube is fixed in position a, its lip being at the maximum distance from the reservoir wall 40. The driving shaft is now set in rotation in the direction of the arrow in Fig. 2, and owing to centrifugal force any liquid that may be in the working chamber is discharged into the reservoir chamber by the drain ports 42, and the liquid in the reservoir chamber forms a ring the inner cylindrical surface of which is denoted by 84. The radius of the surface 84 is slightly larger than the distance of the lip of the scoop tube from the coupling axis, so that the scoop tube is inoperative and the working chamber remains empty.

If the control lever 47 is now moved to and latched in a position between the positions A and B, the scoop tube is displaced oppositely to the direction of rotation of the chambers so as to cause its lip to be submerged in the ring of liquid in the reservoir. As this liquid is moving in the direction opposite to that in which the mouth of the scoop is facing, liquid is picked up by the scoop and caused to flow through the port 60 into the working chamber, the rate of transfer being rapid until the diameter of the inner surface of the liquid ring in the reservoir chamber has expanded so far that it tends to leave the lip of the scoop. A restricted discharge of liquid drains from the working chamber through the drain ports 42, being balanced by a similar flow returned to the working chamber by the scoop tube, so that the liquid content of the working chamber is kept constant at a predetermined value corresponding to the position of the control lever.

If the control lever is now moved to and latched in position B, the scoop tube assumes position b in which its lip enters the groove 82 and the reservoir chamber is thereby substantially emptied, the ring of liquid flowing axially into the groove 82 as its thickness approaches zero. The liquid content of the working chamber is now maintained at its normal maximum value.

As long as liquid is being circulated through the working chamber, it is subjected to cooling in various ways. Firstly, the jets of heated liquid discharged by the drain ports 42 are directed on to the wall 40 of the reservoir, which is exposed to the atmosphere, and the consequent rapid flow over this wall causes heat to be abstracted from the liquid. Secondly, the scoop tube agitates the liquid in the reservoir and assists in cooling it by causing it to scour the wall 40. Thirdly, since the back of the impeller 10 is un-shrouded, and since the vortex circulation in the working chamber causes the liquid therein to flow rapidly over the impeller vanes and shell, heat is thereby abstracted from the liquid by the impeller and transferred to the air in which the back of the impeller is exposed.

If desired, a by-pass orifice 85 may be formed in the scoop tube and so positioned as to direct a jet of liquid on the radially inner part of the end wall 41 of the reservoir chamber, which is not normally wetted, so that this wall also assists in cooling.

If, when the driving shaft is rotating, the scoop tube is returned to position a, the working chamber empties into the reservoir chamber through the drain ports 42. If now the driving shaft is retarded to a very low speed, the ring of liquid in the reservoir chamber collapses, and under these circumstances the extension of the gland tube 73 to the right of the disk 76 has an important effect in preventing splashing of liquid through the gland. The dimensions of the reservoir chamber are such that the whole of this liquid can be accommodated in the reservoir chamber below the level of the lowest part of the aperture 78 in the wall 41. As soon as the driving shaft has come to rest, the liquid level falls somewhat, since some of the liquid flows back into the working chamber through those of the ports 42 that are near the bottom.

The outward bulging of the peripheral wall of the reservoir chamber in way of the scoop tube is important where a compact construction is desired. If a plain cylindrical wall is used, the scoop is unable to take up the outermost part of the ring of liquid in the reservoir, which serves no useful purpose and which has a considerable volume owing to its large diameter. This additional volume of useless liquid has to be accommodated below gland level when the coupling is at rest, so that the diameter of the reservoir has to be increased.

In place of the groove 82 shown in Figs. 1 and 2 which is deep enough to accommodate the whole mouth of the scoop tube, there may be employed a shallow groove (such as is shown in Fig. 6) which accommodates only the lip portion at the radially outermost edge of the mouth.

When the coupling is operating, the torque imposed on the control pin 45, due to the pressure of the ring of liquid in the reservoir chamber on the scoop tube, attains its maximum value when the whole of the liquid content of the coupling is in the reservoir chamber and the scoop is in position b. The counterweight 54 is just heavy enough to overcome this maximum torque.

The modification shown in Fig. 3 is designed to secure a small over-all diameter and employs draining means for the working circuit operating as described in the specification of Patent No. 1,937,364.

The working chamber is formed by a shell 14a, fixed to the driving flange 12a, and the impeller 10a. The runner 15a which is fixed to the runner shaft 18a, is placed between the impeller and the driving shaft. The peripheral portions of the impeller and the shell 14a are rigidly clamped together in a ring 17a by means of a hollow screw-threaded plug 90 engaged in this ring. The impeller is provided with a core guide member 91 which includes a channel 92 opening towards the coupling axis opposite the gap 94 between the vaned elements at the return junction of the working circuit. Ducts 93 lead from the channel 92 through the impeller to drain ports 42a, which are directed towards the peripheral wall 40a of the reservoir chamber. This wall is welded to the ring 17a and is bulged outwards at 82a in way of the scoop tube 43a, for the reason hereinbefore described. The scoop tube is fixed to a pin 45a journalled in a boss 98 on the fixed sleeve 19a. A gear wheel 99, also fixed to the scoop tube, engages with gear teeth 100 formed in the end of a control sleeve 101 journalled in the fixed sleeve 19a and capable of being rocked by a control lever 47a to displace the scoop tube. Liquid picked up by the scoop tube is delivered through a duct 95 to filling passages 96 passing through the boss of the impeller.

So long as there is any appreciable quantity of liquid in the working chamber and the coupling is transmitting torque, part of the vortex ring of liquid enters the channel 92 through the gap 94 and is discharged by the drain ports 42a. The effective capacity of the reservoir in this example is equal to the volume of the normal maximum liquid content of the working chamber, that is to say, this volume can be accommodated in the reservoir between the peripheral surface 40a and a cylindrical surface co-axial with the coupling and having a radius not less than the radial distance from the coupling axis to the overflow lip 92a of the channel 92.

With the arrangement shown in Fig. 3 it is desirable to keep the diameter of the aperture 78 in the end wall of the reservoir as small as possible, so as to enable the rest level of the liquid in the reservoir to be kept below this aperture without an excessive length of reservoir.

Figs. 4 and 5 show an arrangement in general similar to that described with reference to Figs. 1 and 2, but provided with the hydraulically-actuated rapid-emptying valves disclosed in the specification of British Patent 470,056. These valves keep closed so long as a supply of liquid is maintained to their control ducts, and they open automatically when this supply ceases. When the hydraulic coupling is transmitting heavy torque, the vortex circulation causes substantial back pressure in the duct connecting the scoop tube to the working chamber; consequently, if this duct were arranged to feed the control duct of rapid-emptying valves as well as the working chamber, back flow from the working chamber would hold these valves closed when the scoop tube was first withdrawn from the liquid in the reservoir and when the torque load was high.

Where it is desired to avoid this effect, the control liquid for the valves is supplied separately from the liquid for charging the working chamber, and in the arrangement shown in Figs. 4 and 5 an auxiliary scoop tube 110 is employed to supply the valves. The shell 14b that covers the back of the runner is provided with a plurality of rapid-emptying valves uniformly spaced round its periphery. One of these is shown at 111. A port 112 leading from the working chamber is surrounded by an annular port 113 leading to a duct 114 opening into the reservoir. The permanently open drain ports 42b for the working chamber open to the duct 114. A thin valve disk 115 is adapted to close the ports 112 and 113 under the influence of fluid pressure exerted by a column of liquid in the control duct 117 formed in the shell 14b and leading from a collecting channel 118 to a passage 120 through a plug 116 which closes the valve chamber. A small port 119 in this plug leads from the valve chamber to the reservoir. The auxiliary scoop tube 110 is fixed to the main scoop tube, and its inner end 121 is arranged to discharge into the collecting channel 118, while its lip extends, with reference to the coupling axis, slightly beyond the lip of the main scoop tube, the circumferential bulge 62b, in the reservoir wall 40b being suitably shaped to accommodate the two lips.

When the coupling is operating with a fixed liquid content, both scoop tubes pick up liquid. The main scoop tube 43 delivers through a duct 68b to the working chamber a flow replacing the discharge through the drain ports 42b. The auxiliary scoop tube 110 delivers to the channel 118 a flow slightly exceeding the discharge through the valve ports 119, so that the control ducts 117 are maintained full of liquid and the valve disks 115 seal the ports 112 and 113.

If the control lever 47 is now operated to withdraw both scoop tubes from the liquid in the reservoir, the control ducts 117 drain through the ports 119, and the consequent fall in pressure in the valve chambers allows the valve disks to be moved outwards by the pressure acting in the ports 112 due to the liquid in the working chamber. The ports 112 and 113 are now put into communication with each other through the valve chamber, and the working chamber can empty rapidly.

In order to refill the working chamber, the scoop is moved slowly so as to submerge the lip of only the auxiliary tube 110, so that the valve control ducts are recharged with liquid and the valve disks thereby returned to their seatings against the ports 112 and 113. On further movement of the control lever the lip of the main scoop tube is submerged, and liquid is delivered to the working chamber.

When the coupling is operating under high torque, some liquid is forced, by the action of the vortex circulation, out of the working chamber through the annular space between the shell 14b and the fixed sleeve 19. In order to prevent this leakage from entering the channel 118, a shield tube 122 is fixed in the central aperture of the shell 14b and projects beyond the lip of the channel 118.

Figs. 6 and 7 show a coupling similar in general to that shown in Fig. 1, but adapted for use as an automatic starting clutch for a three-phase electric motor 130. The impeller 10 is fixed to the driving flange 12c of the motor. The scoop tube control pin 45 is fixed to a crank arm 47c which is movable between stops 131 and 131a and which is urged in a clockwise direction (Fig. 7) by a tension spring 133 acting through a link 132 and pivotally mounted on a bolt 134 adjustably secured to the bracket 20c. The spring 133 biases the scoop tube in such a direction that it tends to be displaced towards the position (shown in full lines in Fig. 7) yielding the minimum degree of filling of the working chamber and at the same time to move oppositely to the direction of rotation of the working and reservoir chambers (shown by the arrow). The torque imposed on the scoop tube by the biasing spring 134 is high enough to keep the crank arm 47c against the stop 131a and therefore the scoop tube in the position shown in full lines in Fig. 7, while the motor 130 is accelerating on star connection, where a star-delta starter is used, or on low voltage where a tapped transformer starter is used, the mouth of the scoop tube being only partly submerged below the liquid surface 64c under these conditions and the rate of filling of the working chamber being relatively slow owing to both the incomplete immersion of the mouth and the reduced radius at which it acts. Since the torque-transmission capacity of the coupling is thus kept very low, the motor accelerates freely, and as its speed approaches synchronism and the starter is switched to delta (or to full voltage), the torque on the scoop tube due to the scooping action overcomes the biasing torque and the tube swings automatically to the position shown in dotted lines. Its mouth is now fully submerged and is at the maximum radius from the coupling axis. The working circuit is therefore rapidly filled. If desired, one or more vanes 135 (Fig. 6) may be fitted to the scoop tube at or near its mouth.

The arrangement shown in Fig. 6 may be modified by omitting the biasing means, the movable scoop and its supporting sleeve and substituting the sleeve 19d and fixed scoop 43d shown in Fig. 10. The mouth of this scoop is adjacent to the peripheral wall of the reservoir chamber, but its area is restricted to such an extent that the motor can be run up to speed before the coupling is filled enough to make its torque transmission capacity so high as to cause the motor to take excessive current.

The effective reservoir capacity of the improved hydraulic coupling when used as starting clutches for electric motors may be less than the volume of the normal maximum liquid content of the working chamber, but should not be less than 50 per cent. of this volume.

In arrangements such as those shown in Figs. 6 and 10 the peripheral leak-off ports 42 may be omitted and the clearance space 42a between the shell 14 and the fixed sleeve 19 relied on for partly exhausting the working chamber to the reservoir chamber when the motor is at rest.

Fig. 8 shows a coupling suitable for use, for example for connecting one of a plurality of marine engines to a common propeller shaft. The shell 14e, the impeller 10e and the reservoir casing 40e rotate with the driving flange 12e, while the runner 15e is fixed to a driving shaft 18e of transmission gearing (not shown). The scoop tube 43, is pivotally mounted in the fixed manifold sleeve 19e and operable for engaging and disengaging the coupling while the engine connected to the flange 12e is running. The scoop feeds a duct 58e leading to a cooler 140, the return ducts 59e from the cooler terminating in a filling and intercepting port 141 in the upper surface of the sleeve 19e. Bores, such as 142, lead from each of the passages of the impeller 10e to the interior of the impeller boss and register, when in the uppermost position, with the port

141. A shallow annular baffle 143 projects into the circuit from the boss of the impeller at its inlet edge. The normal circulation of working liquid follows the full-line arrows. A reversible pump 144, which is drowned or otherwise arranged to be self-priming, is provided in parallel with the cooler 140, and this cooler may be provided with a stop valve 145. The drain ports 42 of the working chamber are fitted with needle valves 146 by which they can be closed when the driving parts are stationary.

If it is desired to disconnect the engine which drives the flange 12e from the shaft 18e, this engine being stationary, the needle valves 146 are shut, and, when the shaft 18e is set in rotation by another engine, the pump 144 is run in such a direction as to cause a circulation following the dotted arrows. Liquid in the coupling is circulated by the runner and the part that enters the uppermost passages of the impeller is trapped by the baffle 143 and drains through the upper bores 142 to the intercepting port 141 whence it is discharged by the pump 144 to the reservoir chamber. When the working chamber has been completely emptied, the pump is stopped.

To enable the driving shaft to be set in rotation by power derived from the shaft 18e, the needle valves 146 are opened and the pump 144 is driven in the opposite direction so as to draw liquid from the reservoir chamber through the scoop tube, which is set in its lowest position, and deliver it to the working chamber. The valve 145, if provided, may be shut while the pump is operating to prevent short-circuiting of some of the flow through the cooler.

The coupling shown in Fig. 9 is arranged similarly to that in Fig. 8, except that the impeller 10f is fixed directly to the driving shaft. When the driving parts are stationary and the driven shaft is running, the runner 15f raises liquid in the working circuit and discharges some of the liquid which it raises against the inner side of the now stationary shell 14f. The part of this discharge that trickles down from the uppermost portion of this shell is intercepted by the port 141 and withdrawn by the pump.

In the kind of couplings shown in Figs. 1, 4, 6, 8, and 9, where the working chamber has peripheral drain ports and where the effective capacity of the reservoir is required to equal the volume of the normal maximum liquid content of the working chamber, it is convenient to make the inside diameter of the reservoir (excluding the groove or other bulge) between 125 and 140 per cent. of the outer profile diameter (indicated by D in Fig. 1) of the toroidal working circuit of the coupling.

For certain purposes, however, where complete interruption of the transmission of power through the hydraulic transmitter is unnecessary, the effective capacity of the reservoir chamber may be less than the volume of the normal maximum liquid content of the working chamber.

We claim:

1. A hydraulic power transmitter of the kinetic type comprising a working chamber including driving and driven vaned elements, a reservoir chamber arranged to rotate with said working chamber, a drain port which is incapable of being closed while said chambers are rotating, which communicates between said chambers and which is capable of exhausting working liquid, under the influence of its energy of motion, from said working chamber, a scoop which is disposed in said reservoir chamber and which is capable of angular displacement eccentrically with respect to the axis of rotation of the transmitter, a filling duct leading from said scoop to said working chamber, and control means for displacing said scoop which is so arranged that, in moving towards the position yielding the maximum degree of filling of said working chamber, its scooping lip moves oppositely to the normal direction of rotation of said chambers.

2. A hydraulic power transmitter of the kinetic type comprising a working chamber including driving and driven vaned elements, a reservoir chamber arranged to rotate with said working chamber, a drain port which is incapable of being closed while said chambers are rotating, which communicates between said chambers and which is capable of exhausting working liquid, under the influence of its energy of motion, from said working chamber, a scoop which is disposed in said reservoir chamber and which is capable of angular displacement eccentrically with respect to the axis of rotation of the transmitter, a filling duct leading from said scoop to said working chamber, biasing means capable of maintaining said scoop in the position yielding the maximum degree of filling of said working chamber, and an actuating member operable for displacing said scoop in such a sense that its scooping lip moves in the direction of rotation of said chambers towards the position yielding the minimum degree of filling of said working chamber.

3. A hydraulic power transmitter of the kinetic type comprising a working chamber formed by an impeller element and a dished shell fixed thereto and enclosing the back of a runner element, a reservoir chamber arranged to rotate with said working chamber and disposed on the side of said shell remote from said impeller element, the back of said impeller element being exposed to the atmosphere, a drain port which is incapable of being closed while said chambers are rotating, which communicates between said chambers and which is capable of exhausting working liquid, under the influence of its energy of motion, from said working chamber, the radius of said reservoir chamber about the axis of rotation of the transmitter exceeding the radius on which said outlet port is disposed, a fixed sleeve passing through said reservoir chamber, a driven shaft fixed on said runner and housed in said sleeve, a scoop which is mounted on said sleeve in said reservoir chamber and which is capable of angular displacement eccentrically with respect to said axis, a filling duct leading from said scoop through said sleeve to said working chamber, and means for controlling the displacement of said scoop.

4. A hydraulic power transmitter of the kinetic type comprising a working chamber including driving and driven vaned elements, a reservoir chamber arranged to rotate with said working chamber, a drain port which is incapable of being closed while said chambers are rotating, which communicates between said chambers and which is capable of exhausting working liquid, under the influence of its energy of motion, from said working chamber, a rapid-emptying valve communicating between said chambers and adapted to be kept closed by liquid under centrifugal force in a control duct, a filling duct leading to said working chamber, a scoop device which is disposed in said reservoir chamber, which is capable of angular displacement eccentrically with respect to the axis of rotation of the transmitter and which comprises a main scoop tube arranged to feed said filling duct and an auxiliary scoop tube arranged to feed said control duct.

5. A hydraulic power transmitter of the kinetic type comprising an annular working chamber having internal vanes and an end wall provided with a central aperture, a shaft penetrating said aperture, a vaned member disposed within said working chamber and fixed to said shaft, a hydraulically-controlled valve mounted on said working chamber, a circumferential channel formed on the outside of said end wall and opening towards the axis of rotation of the transmitter, a control duct leading from said channel to said valve, means for supplying control liquid to said channel, and a shield tube disposed between said shaft and said channel for preventing liquid that leaks out of said working chamber through said aperture from entering said channel.

6. A hydraulic power transmitter of the kinetic type comprising a working chamber formed by an impeller element and a dished shell fixed thereto and enclosing the back of a runner element, a reservoir chamber arranged to rotate with said working chamber and disposed on the side of said shell remote from said impeller element, a passage between said chambers which is incapable of being closed while said chambers are rotating and which is so placed as to be capable of exhausting at least a part of the liquid content of said working chamber to said reservoir chamber, a fixed support projecting into said reservoir chamber, a scoop mounted on said support for engaging liquid in said reservoir chamber and provided with a by-pass nozzle positioned to direct a jet of liquid on the end wall of said reservoir chamber remote from said working chamber, and a filling duct leading from said scoop to said working chamber.

7. In a hydraulic power transmitter, a rotary reservoir chamber having an end wall provided with a central aperture, a support penetrating said aperture, a liquid-transfer scoop in said chamber and mounted on said support, and a gland for restraining leakage between said wall and said support, said gland comprising a tube fixed to the inner side of said wall and surrounding said support, an annular diaphragm fixed within said tube intermediate its ends and provided with a drain port through its outer marginal portion, and an annular disk fixed to said support and disposed within said tube on the side of said diaphragm remote from said wall, the surface of said support within the part of said tube between said wall and said diaphragm being shaped to prevent axial creeping of liquid therealong.

8. A hydraulic starting clutch comprising a working chamber having internal vanes, a vaned rotor accommodated within said working chamber, said vaned members constituting the driving and driven portions of the clutch, a reservoir chamber mounted for rotation with said working chamber and having an effective capacity of at least 50 per cent. of the capacity of said working chamber, a permanently-open exhaust passage between said chambers positioned to allow working liquid to gravitate from said working chamber to said reservoir chamber when said clutch is at rest, and means for engaging said clutch automatically at a predetermined rate including a non-rotating support in said reservoir chamber, a scoop mounted on said support for engaging and so disposed that it invariably picks up liquid carried round in said reservoir chamber when said working chamber is partly emptied to said reservoir chamber, and a filling duct leading from said scoop to said working chamber.

9. A hydraulic power transmitter of the kinetic type comprising a working chamber including driving and driven vaned elements, a rotatable reservoir chamber co-axial with and surrounding at least a part of said working chamber, a drain passage communicating between said chambers and capable, at least when said transmitter is operating with substantial slip, of continuously exhausting heated liquid, under the influence of its energy of motion, from said working chamber to said reservoir chamber, a scoop which is disposed in said reservoir chamber and which is capable of angular displacement eccentrically with respect to the axis of rotation of said transmitter, a filling duct which is separate from said drain passage and which leads from said scoop to said working chamber, and control means for displacing said scoop and for fixing it in positions which lie between the limits of its effective range of displacement and which maintain respectively different degrees of filling of said working chamber.

10. A hydraulic power transmitter for use as a starting clutch and comprising a working chamber provided with impelling vanes and enclosing a runner, a rotatable reservoir chamber juxtaposed to and surrounding at least a part of said working chamber, said chambers communicating with each other by means positioned to discharge at least a part of the liquid content of said working chamber to said reservoir chamber when said transmitter is at rest, and said reservoir chamber being capable, when it is rotating, of containing working liquid maintained in ring form by centrifugal force, a scoop which is disposed in said reservoir chamber and which is capable of angular displacement eccentrically with respect to the axis of rotation of said transmitter, a filling duct leading from said scoop to said working chamber, biasing means which urge said scoop to move from the outer position yielding the maximum to the inner position yielding the minimum degree of filling of said working chamber and at the same time oppositely to the direction of rotation of said chambers, and a stop so determining said inner position that the mouth of said scoop engages only the radially innermost layer of said ring of liquid, the strength of said biasing means being such that, when the speed of said chambers rises to a predetermined value, the force due to the scooping action automatically displaces said scoop to said outer position.

11. A hydraulic power transmitter of the kinetic type comprising a working chamber provided with impelling vanes and enclosing a vaned runner, a rotary reservoir chamber co-axial with and at least partly surrounding said working chamber, means for discharging liquid from said working chamber to said reservoir chamber, a non-rotatable sleeve passing through a central aperture in an end wall of said reservoir chamber, a driven shaft to which said runner is fixed and which is housed in said sleeve, a labyrinth gland for restraining leakage between said sleeve and the edge of said aperture, a scoop mounted on said sleeve within said reservoir chamber and capable of angular displacement eccentrically with respect to the axis of rotation of said transmitter, a filling duct in said sleeve and leading from said scoop to said working chamber, and means for controlling the displacement of said scoop, said reservoir chamber being so dimensioned that the normal maximum liquid content of said working chamber can be accommodated within said transmitter below said aperture when said transmitter is at rest with its axis horizontal.

12. A hydraulic coupling for use as a starting clutch and comprising a driving part which is capable of being connected to a driving motor and which includes a working chamber containing impelling vanes and a reservoir chamber juxtaposed to and constrained to rotate with said working chamber, said chambers communicating with each other by means positioned to discharge automatically at least 50 per cent. of the normal maximum liquid content of said working chamber to said reservoir chamber when said chambers are at rest, a non-rotatable sleeve passing coaxially through a central aperture in an end wall of said reservoir chamber, a runner disposed within said working chamber, a driven shaft to which said runner is fixed and which is housed in said sleeve, a labyrinth gland associated with said aperture for restraining leakage between said end wall and said sleeve, and a filling duct including a scoop mounted on said sleeve within said reservoir chamber for engaging liquid therein and a passage in said sleeve leading to said working chamber, said filling duct having a flow capacity so selected that, when the driving motor is started, said scoop delivers liquid to said working chamber at a limited rate such that the motor has time to accelerate to a suitable speed before the working chamber is full enough to transmit the full-load torque of the motor.

13. A hydraulic power transmitter of the kinetic type comprising a rotatable working chamber including driving and driven vaned elements, a rotatable reservoir chamber at least in part surrounding said working chamber, a hydraulically-controlled emptying valve disposed in the wall of said working chamber and opening into said reservoir chamber, liquid transfer means opening out of said reservoir chamber for leading control liquid to said valve, a support passing axially through said reservoir chamber, a scoop on said support for engaging liquid in said reservoir chamber, said scoop having a main outlet leading to said working chamber and an auxiliary outlet capable of supplying liquid to said liquid transfer means for the purpose of controlling said valve, and control means operable for interrupting the flow through said scoop.

14. A hydraulic power transmitter of the kinetic type comprising a rotatable working chamber including driving and driven vaned elements, a rotatable reservoir chamber at least in part surrounding said working chamber, a hydraulically-controlled emptying valve disposed on said working chamber for discharging liquid therefrom to said reservoir chamber, said valve being adapted to be kept closed by liquid under centrifugal force in a control duct rotatable with said working chamber and opening out of said reservoir chamber, a filling duct leading from said reservoir chamber to the interior of said working chamber, and a scoop device which is disposed in said reservoir chamber for engaging liquid therein, which is capable of angular displacement eccentrically with respect to the axis of rotation of said transmitter and which includes a main outlet leading to said filling duct and an auxiliary outlet capable of charging said control duct.

15. A hydraulic power transmitter of the kinetic type comprising a working chamber including driving and driven vaned elements juxtaposed to form a working circuit having the form of a toroidal ring, a rotatable reservoir chamber at least partly surrounding said working chamber and having an internal diameter of between 125 and 140 per cent. of the outer profile diameter of said toroidal working circuit, said working chamber having an emptying passage leading to said reservoir chamber from substantially the radially outermost part of said working chamber, a fixed sleeve projecting coaxially into said reservoir chamber through a central aperture in an end wall thereof, a labyrinth gland associated with said aperture for restraining leakage between said end wall and said sleeve, a shaft fixed to one of said vaned elements and housed in said sleeve, a scoop mounted on said sleeve for engaging liquid in said reservoir chamber, said scoop being capable of angular displacement eccentrically with respect to the axis of rotation of said transmitter, a filling duct leading from said scoop through said sleeve to said working chamber, and an actuating member for said scoop journalled within the part of said sleeve which extends through said aperture.

16. A hydraulic power transmitter of the kinetic type comprising a rotatable working chamber having a central aperture in an end wall thereof and an internally vaned portion, a vaned rotor which is accommodated within said working chamber and which is juxtaposed to said vaned portion to form therewith a toroidal working circuit, a rotatable reservoir shell which is co-axial with and encloses at least a part of said working chamber, which has an effective capacity of at least 50 per cent. of the normal maximum liquid content of said working chamber, and which has a central aperture in an end wall thereof, a fixed sleeve penetrating said apertures, a labyrinth gland including a tubular projection which extends from the end wall of said shell through the interior of the reservoir, said projection having an annular flange, said flange and the inner border of the associated end wall forming an annular channel opening radially inward and provided with a drain port in the neighborhood of its periphery, a shaft accommodated within said sleeve and fixed to said rotor, a passage for exhausting liquid from said working chamber to said reservoir shell, a scoop carried by said sleeve within said reservoir shell and capable of angular displacement eccentrically with respect to said shaft, and a control member journalled within the part of said sleeve which extends within said second mentioned aperture and said gland and operatively connected with said scoop, said sleeve including a filling duct leading from said scoop to the interior of said working chamber.

17. A hydraulic power transmitter of the kinetic type comprising an annular working chamber having internal vanes and an end wall provided with a central aperture, a shaft penetrating said aperture, a vaned member disposed within said working chamber and fixed to said shaft, a hydraulically-controlled valve mounted on and capable of exhausting liquid from said working chamber, said valve being adapted to be kept closed by liquid under centrifugal force contained in a control duct rotating with said working chamber and having a mouth disposed on said end wall outside said working chamber, means for supplying control liquid to said mouth, and a shield member mounted on said working chamber and disposed between said shaft and said mouth for preventing liquid that leaks out of said working chamber through said aperture from entering said mouth.

18. In combination, a driving shaft, a hydraulic power transmitter of the kinetic type comprising a driving portion which is rigidly fixed to said shaft and which includes a rotary casing having an end wall remote from said shaft, a runner accommodated within said casing, a fixed support including a sleeve which penetrates a central aperture in said end wall and which is provided with a duct for filling said transmitter, a driven shaft passing through said sleeve and carrying said runner, and co-operating rings for the register of alignment and axial relationship of said driving shaft and said sleeve, said rings being mounted respectively on said fixed support and on the outside of said end wall.

19. A hydraulic power transmitter including a driving shaft, a driven shaft, a working chamber including driving and driven vaned elements, a runner shaft, a single bearing for said runner shaft mounted on the driving shaft, a flexible coupling connecting the runner shaft and the driven shaft and permitting slight angular but no substantial lateral deviation, and co-operating rings encircling said runner shaft, one being connected to said driving shaft and the other mounted independently thereof for checking the alignment of the driving and driven shafts.

HAROLD SINCLAIR.
ARTHUR CECIL BASEBE.